US007624302B2

(12) United States Patent
Michaelis et al.

(10) Patent No.: US 7,624,302 B2
(45) Date of Patent: *Nov. 24, 2009

(54) SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR

(75) Inventors: Scott L. Michaelis, Plano, TX (US); Anurupa Rajkumari, Round Rock, TX (US); William B. McHardy, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

This patent is subject to a terminal disclaimer.

(21) Appl. No.: 10/972,588

(22) Filed: Oct. 25, 2004

(65) Prior Publication Data

US 2006/0090064 A1 Apr. 27, 2006

(51) Int. Cl.
*G06F 11/00* (2006.01)
(52) U.S. Cl. .......................................... 714/12; 714/11
(58) Field of Classification Search ............. 714/10–13; 712/31
See application file for complete search history.

(56) References Cited

U.S. PATENT DOCUMENTS

| 4,358,823 | A |   | 11/1982 | McDonald et al. |
|---|---|---|---|---|
| 5,226,152 | A |   | 7/1993 | Klug et al. |
| 5,249,188 | A |   | 9/1993 | McDonald |
| 5,537,655 | A |   | 7/1996 | Truong |
| 5,675,794 | A |   | 10/1997 | Meredith |
| 5,751,932 | A |   | 5/1998 | Horst et al. |
| 5,758,058 | A |   | 5/1998 | Milburn |
| 5,764,660 | A |   | 6/1998 | Mohat |
| 5,896,523 | A |   | 4/1999 | Bissett et al. |
| 5,915,082 | A | * | 6/1999 | Marshall et al. ................ 714/11 |
| 5,991,900 | A |   | 11/1999 | Garnett |
| 6,065,135 | A |   | 5/2000 | Marshall et al. |
| 6,141,770 | A |   | 10/2000 | Fuchs et al. |
| 6,148,348 | A |   | 11/2000 | Garnett et al. |
| 6,220,581 | B1 |   | 4/2001 | Mueller |
| 6,263,452 | B1 |   | 7/2001 | Jewett et al. |
| 6,438,687 | B2 |   | 8/2002 | Klein |
| 6,473,869 | B2 |   | 10/2002 | Bissett et al. |
| 6,560,682 | B1 |   | 5/2003 | Miller et al. |

(Continued)

OTHER PUBLICATIONS

U.S. Appl. No. 10/972,796, filed concurrently herewith, entitled "System and Method for Maintaining in a Multi-Processor System a Spare Processor That is in Lockstep for Use in Recovering From Loss of Lockstep for Another Processor".

(Continued)

*Primary Examiner*—Dieu-Minh Le

(57) ABSTRACT

According to one embodiment, a method comprises detecting loss of lockstep (LOL) for a processor in a multi-processor system. The method further comprises determining that the processor for which the LOL is detected is assigned the role of boot processor, and switching the role of boot processor to a spare processor without shutting down the system's operating system. In another embodiment, a method comprises system firmware determining that an LOL is detected for a lockstep pair of processors that are assigned the role of boot processor in a system. The method further comprises determining one of the lockstep pair of processors that is not the cause of the LOL, and copying the state of the determined one of the lockstep pair of processors that is not the cause of the LOL to a spare processor. The method further comprises switching the role of boot processor to the spare processor.

27 Claims, 4 Drawing Sheets

U.S. PATENT DOCUMENTS

| | | | |
|---|---|---|---|
| 6,604,177 | B1 | 8/2003 | Kondo et al. |
| 6,615,366 | B1 | 9/2003 | Grochowski et al. |
| 6,625,749 | B1* | 9/2003 | Quach ......................... 714/10 |
| 6,675,324 | B2 | 1/2004 | Marisetty et al. |
| 6,687,851 | B1 | 2/2004 | Somers et al. |
| 6,754,787 | B2 | 6/2004 | Miller et al. |
| 6,920,581 | B2* | 7/2005 | Bigbee et al. ................. 714/10 |
| 6,948,092 | B2 | 9/2005 | Kondo et al. |
| 7,003,691 | B2 | 2/2006 | Stafford et al. |
| 7,020,800 | B2 | 3/2006 | Fu et al. |
| 7,085,959 | B2* | 8/2006 | Safford ........................ 714/11 |
| 7,134,047 | B2 | 11/2006 | Quach |
| 7,155,721 | B2 | 12/2006 | Stafford et al. |
| 7,191,292 | B2 | 3/2007 | Chaudhry et al. |
| 7,225,355 | B2 | 5/2007 | Yamazaki et al. |
| 7,237,144 | B2 | 6/2007 | Stafford et al. |
| 7,251,746 | B2* | 7/2007 | Fox et al. ...................... 714/13 |
| 2002/0144177 | A1 | 10/2002 | Kondo et al. |
| 2002/0152420 | A1 | 10/2002 | Chaudhry et al. |
| 2003/0051190 | A1 | 3/2003 | Marisetty et al. |
| 2003/0070050 | A1 | 4/2003 | Miller et al. |
| 2003/0126498 | A1 | 7/2003 | Bigbee et al. |
| 2003/0135711 | A1 | 7/2003 | Shoemaker et al. |
| 2003/0140281 | A1* | 7/2003 | Fu et al. ....................... 714/38 |
| 2004/0006722 | A1 | 1/2004 | Safford |
| 2004/0019771 | A1 | 1/2004 | Quach |
| 2004/0078650 | A1 | 4/2004 | Stafford et al. |
| 2004/0078651 | A1 | 4/2004 | Stafford et al. |
| 2004/0153857 | A1 | 8/2004 | Yamazaki et al. |
| 2005/0172164 | A1* | 8/2005 | Fox et al. ...................... 714/13 |
| 2005/0240806 | A1 | 10/2005 | Bruckert et al. |
| 2005/0240811 | A1 | 10/2005 | Stafford et al. |
| 2005/0240829 | A1* | 10/2005 | Safford et al. ................. 714/43 |
| 2006/0085677 | A1 | 4/2006 | Stafford et al. |
| 2006/0136672 | A1 | 6/2006 | Chaudhry et al. |
| 2006/0248384 | A1 | 11/2006 | Safford |
| 2006/0248684 | A1 | 11/2006 | Vosbikian et al. |

OTHER PUBLICATIONS

U.S. Appl. No. 10/973,077, filed concurrently herewith, entitled "System and Method for Establishing a Spare Processor for Recovering From Loss of Lockstep in a Boot Processor".

U.S. Appl. No. 10/972,835, filed concurrently herewith, entitled "System and Method for Using Information Relating to a Detected Loss of Lockstep for Determining a Responsive Action".

U.S. Appl. No. 10/973,076, filed concurrently herewith, entitled "System and Method for Providing Firmware Recoverable Lockstep Protection".

U.S. Appl. No. 10/973,004, filed concurrently herewith, entitled "System and Method for Configuring Lockstep Mode of a Prcessor Module".

U.S. Appl. No. 10/973,003, filed concurrently herewith, entitled "System and Method for Reestablishing Lockstep for a Processor Module for Which Loss of Lockstep is Detected".

U.S. Appl. No. 10/972,888, filed concurrently herewith, entitled "System and Method for System Firmware Causing an Operating System to Idle a Processor".

U.S. Appl. No. 10/973,075, filed concurrently herewith, entitled "System and Method for Reintroducing a Processor Module to an Operating System After Lockstep Recovery".

Notice of Allowance for U.S. Appl. No. 10/972,835 dated Nov. 20, 2008 in the United States.

Notice of Allowance for U.S. Appl. No. 10/972,835 dated Aug. 1, 2008 in the United States.

Office Action for U.S. Appl. No. 10/972,835 dated Mar. 3, 2008 in the United States.

Office Action for U.S. Appl. No. 10/972,835 dated Jul. 12, 2007 in the United States.

Office Action for U.S. Appl. No. 10/973,003 dated Mar. 5, 2008 in the United States.

Office Action for U.S. Appl. No. 10/973,003 dated Sep. 12, 2007 in the United States.

Notice of Allowance for U.S. Appl. No. 10/973,076 dated Nov. 28, 2008 in the United States.

Notice of Allowance for U.S. Appl. No. 10/973,076 dated Jul. 16, 2008 in the United States.

Notice of Allowance for U.S. Appl. No. 10/973,076 dated Jun. 3, 2008 in the United States.

Final Office Action for U.S. Appl. No. 10/973,076 dated Feb. 27, 2008 in the United States.

Office Action for U.S. Appl. No. 10/973,076 dated Sep. 12, 2007 in the United States.

Notice of Allowance for U.S. Appl. No. 10/972,888 dated Nov. 14, 2007 in the United States.

Office Action for U.S. Appl. No. 10/972,888 dated Jul. 18, 2007 in the United States.

Notice of Allowance for U.S. Appl. No. 10/973,004 dated Aug. 1, 2007 in the United States.

Office Action for U.S. Appl. No. 10/973,004 dated Apr. 10, 2007 in the United States.

Final Office Action for U.S. Appl. No. 10/973,075 dated May 12, 2009 in the United States.

Office Action for U.S. Appl. No. 10/973,075 dated Oct. 29, 2008 in the United State.

Office Action for U.S. Appl. No. 10/973,075 dated Mar. 12, 2008 in the United States.

Office Action for U.S. Appl. No. 10/973,075 dated Jul. 2, 2007 in the United States.

Notice of Allowance for U.S. Appl. No. 10/972,796 dated Dec. 19, 2007 in the United States.

Office Action for U.S. Appl. No. 10/972,796 dated Jul. 12, 2007 in the United States.

Shoichi Araki, Real-Time Tracking of Multiple Moving Object Contours in a Moving Camera Image Sequence, vol. E83-D lEICE Trans. Inf. & Syst, Jul. 7, 2000, 9 pages.

Jiang-Bin Zheng, Proceedings of the First International Conference on Machine Learning and Cybernetics, Beijing, Nov. 4-5, 2002, 4 pages.

Jong Ryul Kim, Automatic Localization and Trackign of Moving Objects Using Adaptive Snake Algorithm, ICICS-PCM 2003, Dec. 15-18, 2003, 5 pages, Singapore.

Jianhoa Meng, CVEPS-A Compressed Video Editing and Parsing System, Nov. 18, 1996, pp. 1-11.

Notice of Allowance dated Feb. 11, 2009 for U.S. Appl. No. 10/973,077 in the United States.

Notice of Allowance dated Sep. 23, 2008 for U.S. Appl. No. 10/973,077 in the United States.

Office Action dated Mar. 19, 2008 for U.S. Appl. No. 10/973,077 in the United States.

Office Action dated Sep. 20, 2007 for U.S. Appl. No. 10/973,077 in the United States.

Final Office Action for U.S. Appl. No. 10/972,835 dated Nov. 21, 2007 in the United States.

Office Action for U.S. Appl. No. 10/973,075 dated Dec. 13, 2007 in the United States.

Notice of Allowance, dated Jul. 23, 2009, U.S. Appl. No. 10/973,077, 20 pages.

* cited by examiner

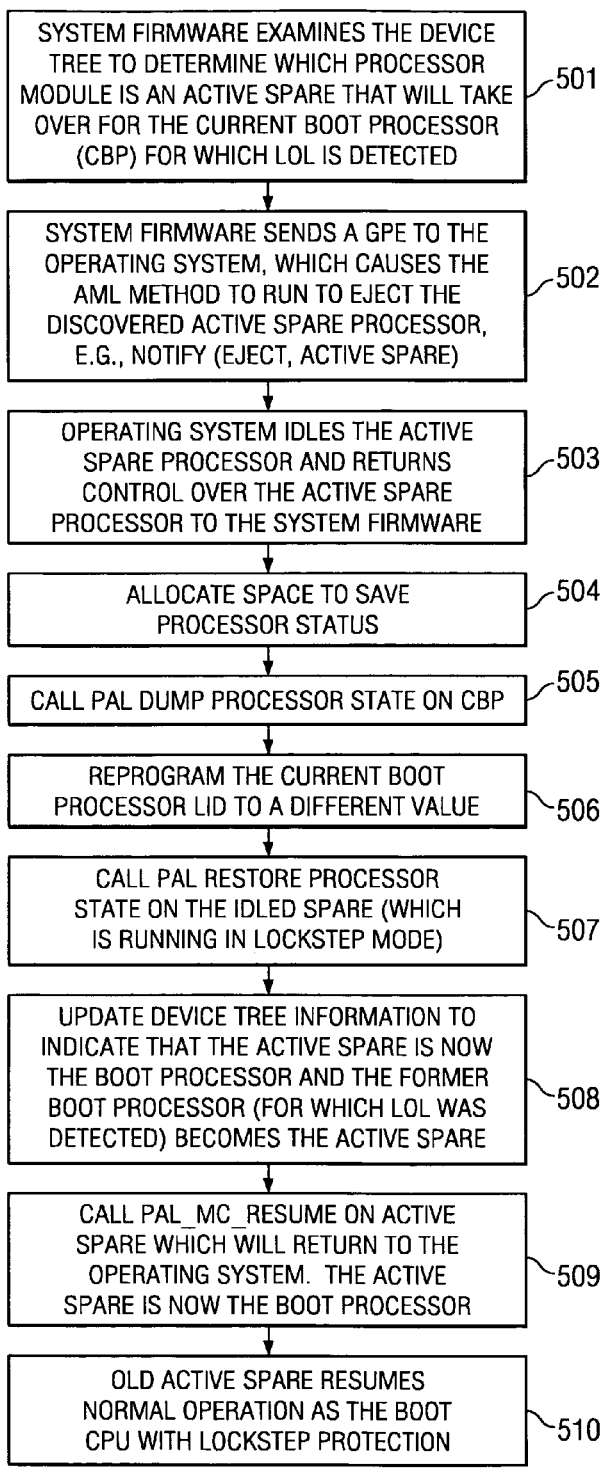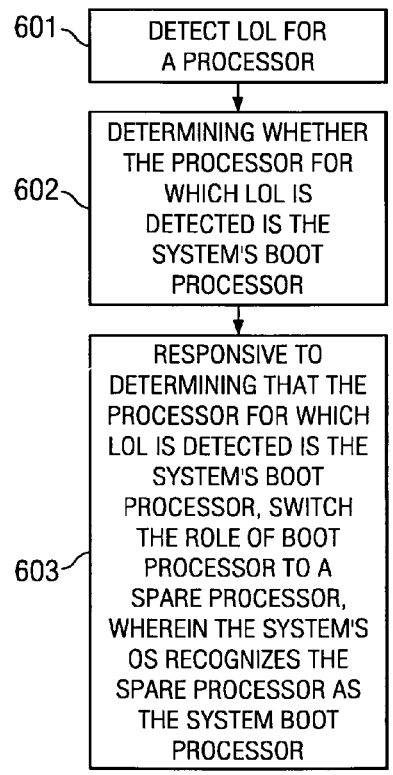

SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR

CROSS-REFERENCE TO RELATED APPLICATIONS

The present application is related to the following concurrently filed and commonly assigned U.S. Patent Applications: U.S. patent application Ser. No. 10/973,077 (U.S. Published Patent Application 20060107112) titled "SYSTEM AND METHOD FOR ESTABLISHING A SPARE PROCESSOR FOR RECOVERING FROM LOSS OF LOCKSTEP IN A BOOT PROCESSOR"; U.S. patent application Ser. No. 10/973,004 (U.S. Published Patent Application 20060107117, now U.S. Pat. No. 7,308,566) titled "SYSTEM AND METHOD FOR CONFIGURING LOCKSTEP MODE OF A PROCESSOR MODULE"; U.S. patent application Ser. No, 10/972,835 (U.S. Published Patent Application 20060107114) titled "SYSTEM AND METHOD FOR USING INFORMATION RELATING TO A DETECTED LOSS OF LOCKSTEP FOR DETERMINING A RESPONSIVE ACTION"; U.S. patent application Ser. No. 10/972,588 (U.S. Published Patent Application 20060090064) titled "SYSTEM AND METHOD FOR SWITCHING THE ROLE OF BOOT PROCESSOR TO A SPARE PROCESSOR RESPONSIVE TO DETECTION OF LOSS OF LOCKSTEP IN A BOOT PROCESSOR"; U.S. patent application Ser. No. 10/973,003 (U.S. Published Patent Application 20060107116) titled "SYSTEM AND METHOD FOR REESTABLISHING LOCKSTEP FOR A PROCESSOR MODULE FOR WHICH LOSS OF LOCKSThP IS DETECTED"; U.S. patent application Ser. No. 10/972,888 ( U.S. Published Patent Application 20060107115) titled "SYSTEM AND METHOD FOR SYSTEM FIRMWARE CAUSING AN OPERATING SYSTEM TO IDLE A PROCESSOR"; U.S. patent application Ser. No. 10/973,075 (U.S. Published Patent Application 20060107111) titled "SYSTEM AND METHOD FOR REINTRODUCING A PROCESSOR MODULE TO AN OPERATING SYSTEM AFTER LOCKSTEP RECOVERY"; U.S. patent application Ser. No. 10/972,796 (U.S. Published Patent Application 20060107106) titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosures of which arc hereby incorporated herein by reference.

DESCRIPTION OF RELATED ART

Silent Data Corruption ("SDC") is a difficult problem in the computing industry. In general, SDC refers to data that is corrupt, but which the system does not detect as being corrupt. SDCs primarily occur due to one of two factors: a) a broken hardware unit or b) a "cosmic" event that causes values to change somewhere in the system. Broken hardware means that a "trusted" piece of hardware is silently giving wrong answers. For example, the arithmetic unit in a processor is instructed to add 1+1 and it returns the incorrect answer 3 instead of the correct answer 2. An example of a cosmic event is when a charged particle (e.g., alpha particle or cosmic ray) strikes a region of a computing system and causes some bits to change value (e.g., from a 0 to a 1 or from a 1 to a 0).

Numerous techniques have been developed for detecting SDC to prevent the SDC from remaining "silent" or "undetected" within a system, as well as preventing such SDC from propagating through the system. Examples of these techniques include parity-based mechanisms and error correcting codes (ECCs) on buses and memory locations, as well as checksums and/or cyclic redundancy checks (CRC) over regions of memory. Parity-based mechanisms are often employed in processors, wherein a parity bit is associated with each block of data when it is stored. The parity bit is set to one or zero according to whether there is an odd or even number of ones in the data block. When the data block is read out of its storage location, the number of ones in the block is compared with the parity bit. A discrepancy between the values indicates that the data block has been corrupted. ECCs are parity-based mechanisms that track additional information for each data block. The additional information allows the corrupted bit(s) to be identified and corrected.

Parity/ECC mechanisms have been employed extensively for caches, memories, and similar data storage arrays. In the remaining circuitry on a processor, such as data paths, control logic, execution logic, and registers (the "execution core"), it is more difficult to apply parity/ECC mechanisms for SDC detection. Thus, there is typically some unprotected area on a processor in which data corruption may occur and the parity/ECC mechanisms do not prevent the corrupted data from actually making it out onto the system bus. One approach to SDC detection in an execution core (or other unprotected area of the processor chip) is to employ "lockstep processing." Generally, in lockstep processing two processors are paired together, and the two processors perform exactly the same operations and the results are compared (e.g., with an XOR gate). If there is ever a discrepancy between the results of the lockstep processors, an error is signaled. The odds of two processors experiencing the exact same error at the exact same moment (e.g., due to a cosmic event occurring in both processors at exactly the same time or due to a mechanical failure occurring in each processor at exactly the same time) is nearly zero.

A pair of lockstep processors may, from time to time, lose their lockstep. "Loss of lockstep" (or "LOL") is used broadly herein to refer to any error in the pair of lockstep processors. One example of LOL is detection of data corruption (e.g., data cache error) in one of the processors by a parity-based mechanism and/or ECC mechanism. Another example of LOL is detection of the output of the paired processors not matching, which is referred to herein as a "lockstep mismatch." It should be recognized that in some cases the data in the cache of a processor may become corrupt (e.g., due to a cosmic event), which once detected (e.g., by a parity-based mechanism or ECC mechanism of the processor) results in LOL. Of course, unless such corrupt data is acted upon by the processor, the output of that processor will not fail to match the output of its paired processor and thus a "lockstep mismatch" will not occur. For example, suppose that a value of "1" is stored to first location of cache in each of a pair of lockstep processors and a value of "1" is also stored to a second location of cache in each of the pair of lockstep processors. Further suppose that a cosmic event occurs for a first one of the processors, resulting in the first location of its cache being changed from "1" to "0", and thus corrupted. This data corruption in the first processor is a LOL for the pair. An error detection mechanism of this first processor may detect the data corruption, thus detecting the LOL. If the processors are instructed to act on the data of their first cache locations, then a lockstep mismatch will occur as the output of each of the processors will not match. For instance, if the processors each add the data stored to the first location of their respective cache with the data stored to the second location of their respective cache, the first processor (having the corrupt data) will output a result of "1" (0+1=1) while the second processor outputs a result of "2" (1+1=2), and thus their respective outputs will not match.

By employing such techniques as parity-based error detection mechanisms and output comparisons for lockstep paired processors, SDC detection can be enhanced such that practically no SDC occurring in a processor goes undetected (and thus such SDC does not remain "silent") but instead results in detection of LOL. However, the issue then becomes how best for the system to respond to detected LOL. The traditional response to detected LOL has been to crash the system to ensure that the detected error is not propagated through the system. That is, LOL in one pair of lockstep processors in a system halts processing of the system even if other processors that have not encountered an error are present in the system. However, with the increased desire for many systems to maintain high availability, crashing the system each time LOL is detected is not an attractive proposition. This is particularly unattractive for large systems having many processors because cosmic events typically occur more frequently as the processor count goes up, which would result in much more frequent system crashes in those large systems. High availability is a major desire for many customers having large, multi-processor systems, and thus having their system crash every few weeks is not an attractive option. Of course, permitting corrupt data to propagate through the system is also not a viable option.

Prior solutions attempting to resolve at least some detected SDCs without requiring the system to be crashed have been Operating System ("OS") centric. That is, in certain solutions the OS has been implemented in a manner to recover from a detected LOL without necessarily crashing the system. This OS-centric type of solution requires a lot of processor and platform specific knowledge to be embedded in the OS, and thus requires that the OS provider maintain the OS up-to-date as changes occur in later versions of the processors and platforms in which the OS is to be used. This is such a large burden that most commonly used OSs do not support lockstep recovery.

Certain solutions have attempted to recover from a LOL without involving the OS in such recovery procedure. For instance, in one technique upon LOL being detected, firmware is used to save the state of one of the processors in a lockstep pair (the processor that is considered "good") to memory, and then both processors of the pair are reset and reinitialized. Thereafter, the state is copied from the memory to each of the processors in the lockstep pair. This technique makes the processors unavailable for an amount of time without the OS having any knowledge regarding this unavailability, and if the amount of time required for recovery is too long, the system may crash. That is, typically, if a processor is unresponsive for X amount of time, the OS will assume that the processor is hung and will crashdump the system so that the problem can be diagnosed. Further, in the event that a processor in the pair cannot be reset and reinitialized (e.g., the processor has a physical problem and fails to pass its self-test), this technique results in crashing the system.

BRIEF SUMMARY OF THE INVENTION

According to one embodiment, a method comprises detecting loss of lockstep (LOL) for a processor in a multi-processor system. The method further comprises determining that the processor for which the LOL is detected is assigned the role of boot processor, and switching the role of boot processor to a spare processor without shutting down the system's operating system.

According to one embodiment, a method comprises system firmware determining that loss of lockstep (LOL) is detected for a lockstep pair of processors that are assigned the role of boot processor in a system. The method further comprises determining one of the lockstep pair of processors that is not the cause of the LOL, and copying the state of the determined one of the lockstep pair of processors that is not the cause of the LOL to a spare processor. The method further comprises switching the role of boot processor to the spare processor.

According to one embodiment, a system comprises a plurality of processor modules that each include a master processor and a slave processor that operate in lockstep. The system further comprises an operating system, and error detection logic operable to detect loss of lockstep (LOL) for at least one of the processor modules. The system further comprises system firmware operable, responsive to detection of LOL for a first of the processor modules, to determine whether the first processor module is assigned a role of system boot processor. If determined that the first processor module is assigned the role of system boot processor, the system firmware is further operable to cause the operating system to recognize another processor module as system boot processor without shutting down the operating system.

According to one embodiment, a system comprises means for detecting loss of lockstep (LOL) for a processor in a multi-processor system. The system further comprises means for determining whether the processor for which the LOL is detected is assigned the role of boot processor, and means for switching the role of boot processor to a spare processor without shutting down the system's operating system if determined that the processor for which the LOL is detected is assigned the role of boot processor.

BRIEF DESCRIPTION OF THE DRAWINGS

FIG. 5 shows an exemplary operational flow diagram for switching the role of boot processor to an active spare processor according to one embodiment; and FIG. 6 shows a more general operational flow diagram for certain embodiments.

DETAILED DESCRIPTION OF THE INVENTION

Figure 1:
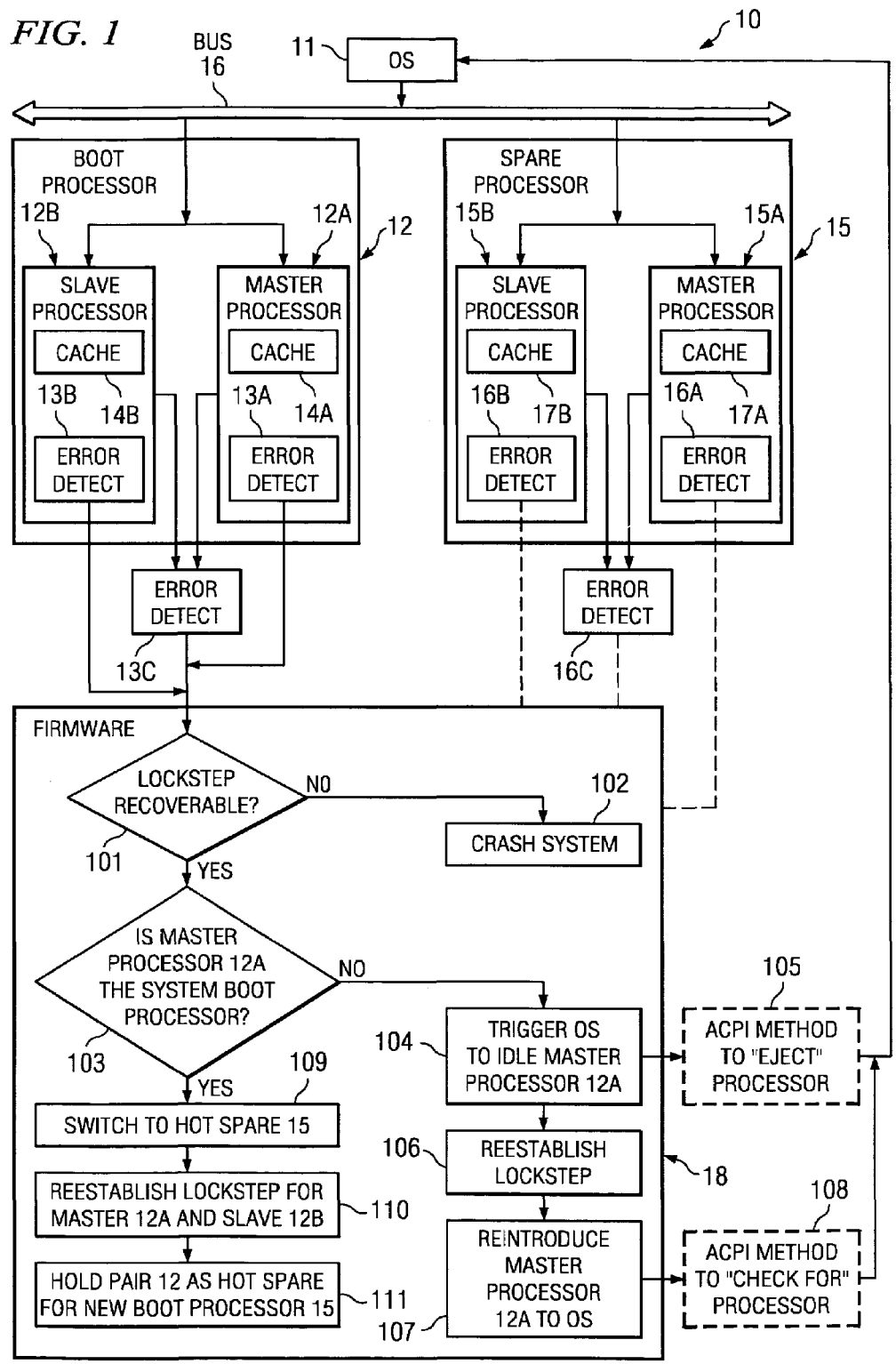
FIG. 1 shows an example multi-processor system in which firmware utilizes a spare processor for recovering from LOL for the system's boot processor.

As described further herein and in concurrently filed and commonly assigned U.S. patent application Ser. No. 10/973,076 (U.S. Published Patent Appplication 20060107107) titled "SYSTEM AND METHOD FOR PROVIDING FIRMWARE RECOVERABLE LOCKSTEP PROTECTION," the disclosure of which is incorporated herein by reference, certain techniques are provided for recovering from LOL detected for a boot processor in a multi-processor system, in which a spare processor is utilized for such recovery. For instance, upon LOL being detected for the system's boot processor, the spare processor assumes the role of boot processor, and then recovery of lockstep for the original boot processor is attempted. Accordingly, for such lockstep recovery technique, a spare processor is used for attempting to recover from LOL detected for the boot processor. Exemplary techniques are described in concurrently filed and commonly assigned U.S. patent application Ser. No. 10/973,077 (U.S. Published Patent Application 20060107112) titled "SYSTEM AND METHOD FOR ESTABLISHING A SPARE PROCESSOR FOR RECOVERING FROM LOSS OF LOCKSTEP IN A BOOT PROCESSOR," the disclosure of which is incorporated herein by reference, for establishing a spare processor for the boot processor. Such exemplary techniques include techniques for establishing a hot spare processor that is held in reserve until such time as it is used to assume the role of boot processor responsive to a detected LOL in the boot processor. The exemplary techniques further include techniques for establishing an active spare processor that is not held in reserve, but is instead made available to the OS for executing instructions during normal system operation and is dynamically transformed into a hot spare (i.e., it is idled) such that it can assume the role of the boot processor responsive to detection of LOL in the boot processor.

Embodiments are provided herein for switching the role of boot processor to an established spare processor responsive to detection of LOL in the boot processor. For instance, exemplary actions by system firmware for switching the role of boot processor to an established spare processor and thus causing the OS to recognize the established spare processor as the system's boot processor are provided in accordance with certain embodiments hereof.

As described further in concurrently filed and commonly assigned U.S. patent application Ser. No. U.S. patent application Ser. No. 10/973,077 (U.S. Published patent application 20060107112) titled "SYSTEM AND METHOD FOR ESTABLISHING A SPARE PROCESSOR FOR RECOVERING FROM LOSS OF LOCKSTEP IN A BOOT PROCESSOR," in certain embodiments, information (referred to herein as a "device tree") is stored to a multi-processor system, wherein such information identifies the processor in the system that is the boot processor and identifies the processor that is the spare for the boot processor. The information is stored such that it is accessible by the system's firmware, and the firmware, upon detecting LOL for the boot processor, determines the spare processor from the device tree and assigns the spare processor the role of boot processor. The firmware then attempts to recover lockstep for the processor for which LOL was detected. If the recovery of lockstep is successful, the processor for which lockstep was recovered (i.e., the former boot processor) may be assigned the role of spare for the current boot processor. Thus, the multi-processor system may recover from LOL detected for the boot processor without requiring a crash of the system (at least for certain types of "recoverable" LOLs).

In some implementations described herein, the spare processor for the boot processor is a "hot" spare, in which it is idled and not made available to the OS for processing instructions during normal system operation. That is, the hot spare processor is held in reserve, idling until such time as it assumes the role of boot processor responsive to detected LOL for the boot processor. In other implementations, the spare processor is not held in reserve, but is instead an "active" processor that is made available to the OS for executing instructions during normal system operation. Upon LOL being detected for the boot processor, the designated spare processor is dynamically transformed into a hot spare (i.e., it is idled) such that it can assume the role of the boot processor. For instance, upon the system's firmware detecting a LOL for the boot processor, the firmware accesses the device tree and determines the designated spare processor, and then the firmware instructs the OS to idle the designated spare processor (i.e., stop scheduling instructions for the processor) to make the "active" spare a "hot" spare, which then assumes the role of boot processor.

Concurrently filed and commonly assigned U.S. patent application Ser. No. 10/973,076 (U.S. Published Patent Application 20060107107) titled "SYSTEM AND METHOD FOR PROVIDING FIRMWARE RECOVERABLE LOCKSTEP PROTECTION," discloses a technique in which lockstep can be recovered for processors (particularly, non-boot processors) without requiring use of a spare processor. Rather, upon LOL being detected for a lockstep pair of processors, the firmware instructs the OS to idle (or "eject") the lockstep pair of processors for which LOL was detected and then the firmware attempts to reestablish lockstep (e.g., by resetting the processors). If successful in reestablishing lockstep, the firmware triggers the OS to recognize the lockstep pair of processors as again being available for servicing instructions.

However, for various reasons, in certain system architectures problems arise in attempting to idle (or eject) the boot processor from the system. Thus, in certain embodiments, a spare processor is used for recovering from LOL for the system's boot processor. Again, embodiments are provided herein for switching the role of boot processor to an established spare processor responsive to detection of LOL for the boot processor. In certain embodiments, the spare processor is used for recovering from LOL only in the case in which LOL is detected for the boot processor. For instances in which LOL is detected for non-boot processors, the lockstep may be recovered without the use of a spare by using the recovery technique described in concurrently filed and commonly assigned U.S. patent application Ser. No. 10/973,076 (U.S. Published Patent Application 20060107107 titled "SYSTEM AND METHOD FOR PROVIDING FIRMWARE RECOVERABLE LOCKSTEP PROTECTION," for example.

Turning to FIG. 1, an example embodiment of a system 10 in which a spare processor is used in recovering from detected loss of lockstep (LOL) for a system boot processor is shown. System 10 includes OS 11, as well as master processor 12A and slave processor 12B (collectively referred to as a lockstep processor pair 12). In certain implementations the lockstep processor pair 12 may be implemented on a single silicon chip, which is referred to as a "dual core processor" in which master processor 12A is a first core and slave processor 12B is a second core. Further, lockstep processor pair 12 may be referred to as a processor or CPU "module" because it includes a plurality of processors (12A and 12B) in such module. As described further herein, to certain portions of system 10, such as its OS 11, the processor module 12 may appear as a single processor because slave processor 12B is merely used for redundant processing for checking the output of master processor 12A. In this example, lockstep processor pair 12 is designated as the boot processor for system 10. As described further herein, in certain embodiments lockstep processor pair 12 is designated as the system boot processor by storing information to the system that specifies such designation.

Master processor 12A includes cache 14A, and slave processor 12B includes cache 14B. OS 11 and lockstep processor pair 12 are communicatively coupled to bus 16. Typically, master processor 12A and slave processor 12B are coupled to bus 16 via an interface that allows each of such processors to receive the same instructions to process, but such interface only communicates the output of master processor 12A back onto bus 16. The output of slave processor 12B is used solely for checking the output of mater processor 12A.

In this example, master processor 12A includes error detect logic 13A, and slave processor 12B includes error detect logic 13B. While shown as included in each of the processors 12A and 12B in this example, in certain embodiments the error detect logic 13A and 13B may be implemented external to processors 12A and 12B. Error detect logic 13A and 13B include logic for detecting errors, such as data cache errors, present in their respective processors 12A and 12B. Examples of error detect logic 13A and 13B include known parity-based mechanisms and ECC mechanisms. Error detect logic 13C is also included, which may include an XOR (exclusive OR) gate, for detecting a lockstep mismatch between master processor 12A and slave processor 12B. As mentioned above, a lockstep mismatch refers to the output of master processor 12A and slave processor 12B failing to match. While shown as external to the lockstep processor pair 12 in this example, in certain embodiments error detect logic 13C may be implemented on a common silicon chip with processors 12A and 12B.

Lockstep mismatch is one way of detecting a LOL between the master processor 12A and slave processor 12B. A detection of an error by either of error detect logic 13A and 13B also provides detection of LOL in the processors 12A and 12B. Because the detection of LOL by error detect logic 13A and 13B may occur before an actual lockstep mismatch occurs, the detection of LOL by error detect logic 13A and 13B may be referred to as a detection of a "precursor to lockstep mismatch". In other words, once an error (e.g., corrupt data) is detected by error detect logic 13A or 13B, such error may eventually propagate to a lockstep mismatch error that is detectable by error detect logic 13C.

System 10 further includes a second lockstep processor pair 15 that is communicatively coupled to bus 16. Lockstep processor pair 15 includes master processor 15A and slave processor 15B. Master processor 15A includes cache 17A, and slave processor 15B includes cache 17B. As with error detect logic 13A-13C implemented for lockstep processor pair 12, lockstep processor pair 15 has error detect logic 16A-16C. While only two lockstep processor pairs 12 and 15 are shown for simplicity in the example of FIG. 1, system 10 may include any number of such lockstep processor pairs. As one specific example, in one implementation system 10 includes 64 lockstep processor pairs, wherein the master processors of the pairs perform parallel processing for the system. In the specific example of FIG. 1, lockstep processor pair 15 is designated as a spare for boot processor 12, as described further herein.

In certain embodiments described herein, techniques are provided for switching the role of boot processor to the designated spare processor responsive to detection of LOL for the boot processor. Thus, the spare processor is used for recovery when LOL is detected for the system's boot processor. That is, the designated spare processor assumes the role of boot processor in the event that LOL is detected for the boot processor. In accordance with certain embodiments, upon LOL being detected for a boot processor, a hot spare processor (i.e., an idling processor that is available in the system) is transferred the role of boot processor, and then the old boot processor having LOL is reset to reestablish its lockstep. In other embodiments, a processor is designated as a spare processor for the boot processor, but such designated spare processor is not held in reserve (idled) during normal system operation. Rather, the designated spare is utilized as an active processing resource made available to OS 11 for processing instructions that OS 11 schedules for such "active" spare processor. Upon LOL being detected for the boot processor, the designated spare processor is idled (thereby, transforming such active processor into a hot spare), and is transferred the role of boot processor. Thereafter, the former boot processor for which the LOL was detected may be reset to reestablish its lockstep. Thus, in certain embodiments, a designated spare processor is not required to be held in reserve, but is instead an available resource for use within the system and is only transformed into an actual spare processor when needed for recovering from LOL for the boot processor.

Firmware 18 is also included in system 10, which in this embodiment is invoked upon an error being detected by any of the error detect logics 13A-13C and 16A-16C. In certain embodiments, processors 12A, 12B, 15A, and 15B are processors from the Itanium Processor Family (IPF). IPF is a 64-bit processor architecture co-developed by Hewlett-Packard Company and Intel Corporation, which is based on Explicitly Parallel Instruction Computing (EPIC). IPF is a well-known family of processors. IPF includes processors such as those having the code names of MERCED, MCKINLEY, and MADISON. In addition to supporting a 64-bit processor bus and a set of 128 registers, the 64-bit design of IPF allows access to a very large memory (VLM) and exploits features in EPIC. While a specific example implementation of one embodiment is described below for the IPF architecture, embodiments described herein for establishing a spare processor for recovering from LOL detected for a boot processor are not limited in application to an IPF architecture, but may be applied as well to other architectures (e.g., 32-bit processor architectures, etc.).

Processor architecture generally comprises corresponding supporting firmware, such as firmware 18 of system 10. For example, as described further below in conjunction with the specific example of FIG. 2, the IPF processor architecture comprises such supporting firmware as Processor Abstraction Layer (PAL), System Abstraction Layer (SAL), and Extended Firmware Interface (EFI). Such supporting firmware may enable, for example, the OS to access a particular function implemented for the processor. For instance, the OS may query the PAL as to the size of the cache implemented for the processor, etc. Other well-known functions provided by the supporting firmware (SAL, EFI) include, for example: (a) performing I/O configuration accesses to discover and program the I/O Hardware (SAL_PCI_CONFIG_READ and SAL_PCI_CONFIG_WRITE); (b) retrieving error log data from the platform following a Machine Check Abort (MCA) event (SAL_GET_STATE_INFO); (c) accessing persistent store configuration data stored in non-volatile memory (EFI variable services: GetNextVariableName, GetVariable and SetVariable); and accessing the battery-backed real-time clock/calendar (EFI GetTime and SetTime). Accordingly, the supporting firmware, such as the PAL, is implemented to provide an interface to the processor(s) for accessing the functionality provided by such processor(s). Each of those interfaces provide standard, published procedure calls that are supported.

In the example system 10 of FIG. 1, firmware 18 utilizes the above-mentioned hot spare technique for recovering from LOL for a boot processor. That is, processor 15 is designated as a hot spare for boot processor 12, and such processor 15 is held as an idle, spare processor and used in the manner described further herein for assuming the role of boot processor in the event that a LOL is detected for boot processor 12. Of course, as described further herein, the above-mentioned technique in which a designated spare is not held in reserve but is instead dynamically transformed into a spare processor may be implemented by firmware 18 in alternative embodiments. As described further herein, in certain embodiments, a device tree is stored to a data storage device (e.g., SRAM) such that it is accessible to the firmware 18, wherein the device tree includes information identifying processor 12 as the system's boot processor and identifying processor 15 as the spare. The information specifying the boot processor and/or spare may be received as input from a user in certain embodiments. For instance, in certain embodiments a user interface is provided that enables a system administrator to designate the boot processor and/or spare processor in the multi-processor system. In other embodiments, the firmware 18 selects the boot processor and/or spare.

Suppose that during the system boot-up procedure, master processor 12A assumes the role of boot processor, as shown in the example of FIG. 1. In this example embodiment, lockstep processor pair 15 is held as a hot spare for recovering from a LOL that may be detected for the boot processor 12A. Of course, additional lockstep processor pairs may be included in system 10 (not specifically shown in the example of FIG. 1), and those additional lockstep processor pairs, which are not the system boot processor, may recover from LOL in a different manner that does not utilize a hot spare processor. Thus, in accordance with certain embodiments hereof, hot spare processor pair 15 is not needed for recovering from LOL detected for any non-boot processor, but may instead be used for recovery of LOL only if such LOL is detected for the boot processor (processor 12A in this example).

Firmware 18 is included in this example, and upon detection of LOL by any of error detect logics 13A-13C, firmware 18 determines, in operational block 101, whether the detected LOL is a recoverable LOL. That is, firmware 18 determines in block 101 whether the detected LOL is of a type from which the firmware can recover lockstep for the lockstep processor pair 12 without crashing the system. As described further herein, lockstep is recoverable for certain detected LOLs (which may be referred to as "recoverable LOLs"), while lockstep is not recoverable for other detected LOLs (which may be referred to as "non-recoverable LOLs"). If the lockstep is not recoverable from the detected LOL, then in the example of FIG. 1 firmware 18 crashes the system in block 102.

If the lockstep is recoverable, then operation advances to block 103 whereat the firmware determines whether the processor for which the LOL was detected is the system's boot processor. Because the LOL is detected for the lockstep processor pair 12 in this example, firmware 18 determines whether master processor 12A is the system's boot processor. This can be determined, for example, by accessing the device tree 203 of FIG. 2 (described further below). The device tree may, in certain implementations, include a field for each processor indicating whether such processor is the system's boot processor. This field in the device tree may be set by the firmware during the boot-up process to identify the corresponding processor that is used as the system's boot processor or it may be pre-set by a system administrator (e.g., via a user interface), as examples. If determined in block 103 that the master processor 12A is not the system's boot processor, then operation advances in this example to block 104, and a lockstep recovery process is performed that does not utilize hot spare 15.

In the specific example shown in FIG. 1, if the lockstep is determined to be recoverable in block 101 and the processor for which the LOL is detected is determined in block 103 to not be the system boot processor, firmware 18 cooperates with OS 11 via standard OS methods to recover the lockstep. For instance, in the example embodiment of FIG. 1, Advanced Configuration and Power Interface (ACPI) methods are used by firmware 18 to cooperate with OS 11. Accordingly, no processor or platform specific knowledge is required to be embedded in OS 11, but instead any ACPI-compatible OS may be used, including without limitation HP-UX and Open VMS operating systems. Example techniques that may be used for recovering from LOL for non-boot processors of a system are described further in concurrently filed and commonly assigned U.S. patent application Ser. No. 10/973,076 titled "SYSTEM AND METHOD FOR PROVIDING FIRMWARE RECOVERABLE LOCKSTEP PROTECTION," the disclosure of which is incorporated herein by reference.

In the example embodiment of FIG. 1, if determined in block 103 that the processor for which the LOL is detected is not the system boot processor, firmware 18 triggers OS 11 to idle the master processor 12A in operational block 104. In this embodiment, firmware 18 utilizes an ACPI method 105 to "eject" master processor 12A, thereby triggering OS 11 to idle the master processor 12A (i.e., stop scheduling tasks for the processor). Of course, by idling master processor 12A, slave processor 12B will in turn be idled. Thus, idling master processor 12A results in idling the lockstep processor pair 12. In this example embodiment, OS 11 is not aware of the presence of slave processor 12B, but is instead aware of master processor 12A. The interface of lockstep processor pair 12 to bus 16 manages copying to slave processor 12B the instructions that are directed by OS 11 to master processor 12A. Thus, firmware 18 need not direct OS 11 to eject slave processor 12B, as OS 11 is not aware of such slave processor 12B in this example implementation. Again, by idling master processor 12A, slave processor 12B is also idled as it merely receives copies of the instructions directed to master processor 12A. Of course, if in a given implementation OS 11 is aware of slave 12B, firmware 18 may be implemented to also direct OS 11 to idle such slave processor 12B in a manner similar to that described for idling master processor 12A.

Firmware 18 then attempts to recover lockstep for the lockstep processor pair 12 in block 106. For instance, firmware 18 resets the processor pair 12. During such reset of processor pair 12, system 10 can continue to operate on its remaining available processors. Once the processor pair 12 is reset and lockstep is recovered, firmware 18 reintroduces master processor 12A to OS 11 in operational block 107. In this embodiment, firmware 18 updates the ACPI device table information for master processor 12A to indicate that such master processor 12A is "present, functioning and enabled." As discussed in the ACPI 2.0 specification for the _STA status method of a device, the _STA (status) object returns the status of a device, which can be one of the following: enabled, disabled, or removed. In this respect, in the result code (bitmap) bit 0 is set if the device is present; bit 1 is set if the device is enabled and decoding its resources; bit 2 is set if the device should be shown in the UI; bit 3 is set if the device is functioning properly (cleared if the device failed its diagnostics); bit 4 is set if the battery is present; and bits 5-31 are reserved. A device can only decode its hardware resources if both bits 0 and 1 are set. If the device is not present (bit 0 cleared) or not enabled (bit 1 cleared), then the device must not decode its resources. Bits 0, 1 and 3 are the "present, enabled and functioning" bits mentioned above. Firmware 18 utilizes an ACPI method 108 to trigger OS 11 to "check for" master processor 12A, thereby reintroducing the master processor 12A to OS 11. As a result of checking for master processor 12A, OS 11 will recognize that such master processor 12A is again available and will thus begin scheduling tasks for master processor 12A once again.

In view of the above, a recovery technique is provided that does not require utilizing a spare processor for recovering from LOL detected for non-boot processors. For various reasons, in certain system architectures problems arise in attempting to idle (or eject) the boot processor from the system. Thus, in certain embodiments, a hot spare processor is used for recovering from LOL for the system's boot processor. For instance, in the example of FIG. 1, if determined in block 103 that the master processor 12A is the system's boot processor, operation advances to block 109 whereat the state of the "good" processor in the lockstep processor pair 12 is copied over to each of processors 15A and 15B in the spare lockstep processor pair 15. Exemplary techniques that may be utilized by firmware 18 for switching the role of boot processor to the hot spare are described further herein below.

Thus, operational block 109 essentially makes the spare processor pair 15 the system's boot processor, and then in certain embodiments firmware 18 resets the lockstep processor pair 12 and reestablishes its lockstep in block 110. Once lockstep is reestablished for lockstep processor pair 12, that pair is held in operational block 111 as a hot spare for the new boot processor pair 15. That is, firmware 18 updates the device tree 203 of FIG. 2 to reflect that lockstep processor pair 12 is a hot spare for the boot processor pair 15. Thus, should a recoverable LOL be detected for the new boot processor 15, the above process may be used by firmware 18 to make the spare lockstep processor pair 12 the boot processor and then recover lockstep for pair 15. An example technique for resetting the lockstep processor pair 12 and reestablishing its lockstep in which the lockstep processor pair 12 is then held as a hot spare is described further in concurrently filed and commonly assigned U.S. patent application Ser. No. 10/972, 796 (U.S. Published Patent Application 20060107106) titled "SYSTEM AND METHOD FOR MAINTAINING IN A MULTI-PROCESSOR SYSTEM A SPARE PROCESSOR THAT IS IN LOCKSTEP FOR USE IN RECOVERING FROM LOSS OF LOCKSTEP FOR ANOTHER PROCESSOR", the disclosure of which is hereby incorporated herein by reference.

Figure 2:
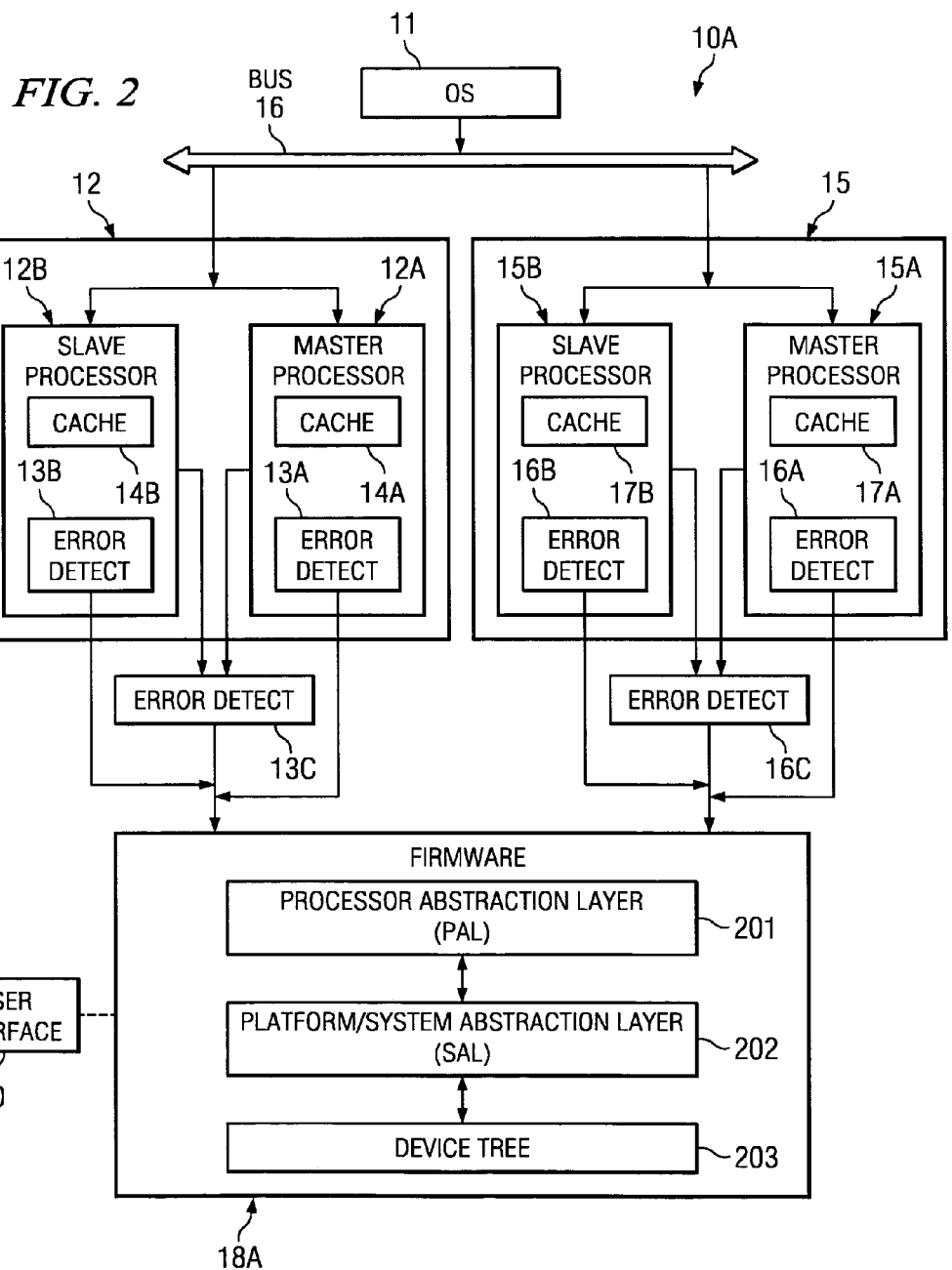
FIG. 2 shows a block diagram of one embodiment implemented for the IA-64 processor architecture.

FIG. 2 shows a block diagram of one embodiment of the above system 10, which is implemented for the IPF processor architecture and is labeled as system $10_A$. The quintessential model of the traditional IPF architecture is given in the *Intel IA-64 Architecture Software Developer's Manual, Volume 2: IA-64 System Architecture*, in section 11.1 *Firmware Model*, the disclosure of which is hereby incorporated herein by reference. Accordingly, in this example embodiment of system $10_A$, firmware 18, labeled as firmware $18_A$, includes processor abstraction layer (PAL) 201 and platform/system abstraction layer (SAL) 202. In general, PAL 201 is firmware provided by Intel for its processors, and SAL 202 is developed by an original equipment manufacturer (OEM) for the specific system/platform in which the processors are to be employed. PAL 201, SAL 202, as well as an extended firmware interface (EFI) layer (not shown), together provide, among other things, the processor and system initialization for an OS boot in an IPF system.

The boot-up process of a traditional IPF system, for example, proceeds as follows: When the system is first powered on, there are some sanity checks (e.g., power on self-test) that are performed by microprocessors included in the system platform, which are not the main system processors that run applications. After those checks have passed, power and clocks are given to a boot processor (which may, for example, be master processor 12A). The boot processor begins executing code out of the system's Read-Only Memory (ROM) (not specifically shown in FIG. 2). The code that executes is the PAL 201, which gets control of system 10. PAL 201 executes to acquire all of the processors in system $10_A$ (recall that there may be many lockstep processor pairs, such as pairs 12 and 15) such that the processors begin executing concurrently through the same firmware.

After it has performed its duty of initializing the processor(s), PAL 201 passes control of system $10_A$ to SAL 202. It is the responsibility of SAL 202 to discover what hardware is present on the system platform, and initialize it to make it available for the OS 11. When main memory is initialized and functional, the firmware $18_A$ is copied into the main memory. Then, control is passed to EFI (not shown), which is responsible for activating boot devices, which typically includes the disk. The EFI reads the disk to load a program into memory, typically referred to as an operating system loader. The EFI loads the OS loader into memory, and then passes it control of system $10_A$ by branching the boot processor into the entry point of such OS loader program.

The OS loader program then uses the standard firmware interfaces to discover and initialize system $10_A$ further for control. One of the things that the OS loader typically has to do in a multi-processor system is to retrieve control of the other processors (those processors other than the boot processor). For instance, at this point in a multi-processor system, the other processors may be executing in do-nothing loops. In an ACPI-compatible system, OS 11 makes ACPI calls to parse the ACPI tables to discover the other processors of a multi-processor system in a manner as is well-known in the art. Then OS 11 uses the firmware interfaces to cause those discovered processors to branch into the operating system code. At that point, OS 11 controls all of the processors and the firmware $18_A$ is no longer in control of system $10_A$.

As OS 11 is initializing, it has to discover from the firmware $18_A$ what hardware is present at boot time. And in the ACPI standards, it also discovers what hardware is present or added or removed at run-time. Further, the supporting firmware (PAL, SAL, and EFI) are also used during system runtime to support the processor. For example, OS 11 may access a particular function of master processor 12A via the supporting firmware $18_A$, such as querying PAL 201 for the number, size, etc., of the processor's cache 14A. Some other well-known firmware functions that OS 11 may employ during runtime include: (a) PAL 201 may be invoked to configure or change processor features such as disabling transaction queuing (PAL_BUS_SET_FEATURES); (b) PAL 201 may be invoked to flush processor caches (PAL_CACHE_FLUSH); (c) SAL 202 may be invoked to retrieve error logs following a system error (SAL_GET_STATE_INFO, SAL_CLEAR_STATE_INFO); (d) SAL 202 may be invoked as part of hot-plug sequences in which new I/O cards are installed into the hardware (SAL_PCI_CONFIG_READ, SAL_PCI_CONFIG_WRIT); (e) EFI may be invoked to change the boot device path for the next time the system reboots (SetVariable); (f) EFI may be invoked to change the clock/calendar hardware settings; and (g) EFI may be invoked to shutdown the system (ResetSystem).

A "device tree" is provided, which is shown as device tree 203 in this example. Device tree 203 is stored in SRAM (Scratch RAM) on the cell, which is RAM that is reinitialized. Firmware 18A builds the device tree 203 as it discovers what hardware is installed in the system. Firmware then converts this information to the ACPI tables format and presents it to OS 11 so that OS 11 can know what is installed in the system. The ACPI device tables (not shown) are only consumed by OS 11 at boot time, so they are never updated as things change. For OS 11 to find the current status, it calls an ACPI "method" to discover the "current status". The _STA method described above is an example of such an ACPI method. When _STA is called, the AML can look for properties on the device specified in the firmware device tree and convert that into the Result Code bitmap described above. So, if lockstep has been lost on a processor, firmware 15A will set the device tree property that indicates loss of lockstep, then when OS 11 calls _STA for that device, the "lockstep lost" property directs the AML code to return to "0" in the "functioning properly" bit so that OS 11 can know there is a problem with that processor.

If a lost lockstep is recovered in accordance with the recovery technique described herein, firmware 18A can indicate that lockstep has been recovered in the device tree 203. Then when _STA is called on that device responsive to the OS receiving the "check for device" ACPI method, the present, enabled and functioning bits will all be set and OS 11 will know the CPU is safe to use.

Further, device tree 203 includes information designating which processor is the boot processor, as well as a spare processor for the boot processor. A simple example of device tree 203 is shown below in Table 1:

TABLE 1

| Device | Status | Lockstep Enabled | Boot Processor? | Spare for Boot Processor? |
|---|---|---|---|---|
| Processor A | Present, Enabled, and Functioning | Yes | Yes | No |
| Processor B | N/A | Yes | No | Yes |
| Processor C | Present, Enabled, and Functioning | Yes | No | No |
| ... | ... | ... | ... | ... |

In the above example of Table 1, 3 processors "Processor A," "Processor B," and "Processor C" are identified in the device tree as being included in the multi-processor system. The status of each of processors Processor A and Processor B is identified as "Present, Enabled, and Functioning." In this example Processor B is a hot spare, so it is held in reserve and does not show up in the static ACPI tables that are built when the system boots. Accordingly the OS does not know about Processor B and does not have a device handle to call the _STA method on. As described above, the _STA method is a known ACPI method for checking the status of the corresponding device. Therefore, the status of Processor B is designated N/A (not applicable) in this example because the _STA method will not be called for this processor as long as it is the hot spare. Of course, upon such spare assuming the role of boot processor, its status is updated to "Present, Enabled, and Functioning." In other embodiments in which Processor B is an active spare, the OS will be aware of such processor and accordingly its status may be also indicated as "Present, Enabled, and Functioning."

Further, lockstep is identified in this example as enabled for these processors. In certain embodiments, the system administrator can designate, via user interface 20, whether lockstep mode is to be enabled for the system's processors. Further, Processor A is designated as the system's boot processor in the example device tree shown in Table 1, and Processor B is designated as the spare processor. Thus, upon detection of LOL for one of the processors in the system, the firmware can access this device tree to determine if the processor for which LOL is detected is the system's boot processor; and if determined that the processor for which LOL is detected is the system's boot processor, the firmware can further determine from this device tree the designated spare processor to use in the lockstep recovery process.

In the example of FIG. 2, a user interface 20 is included, which allows a user (e.g., system administrator) to designate the system's boot processor and spare processor. In certain embodiments, the user interface 20 further allows the user to designate other information, such as whether lockstep mode is enabled for the processors.

Figure 3:
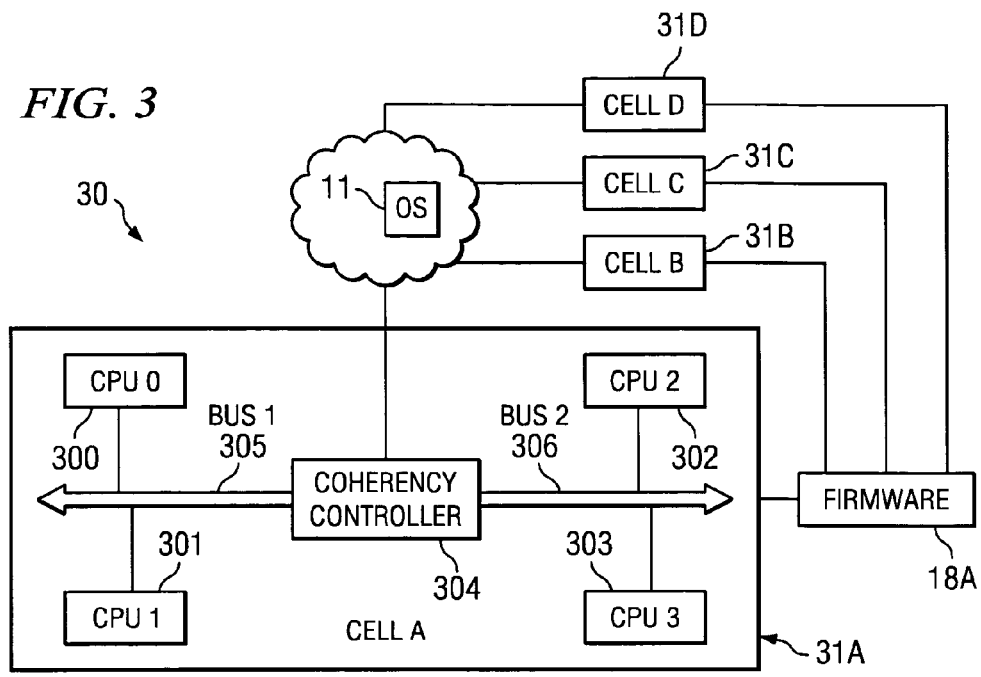
FIG. 3 shows an example system having multi-processor cells in which an embodiment for switching the role of boot processor to a spare processor responsive to detected LOL in the boot processor may be employed.

One example system in which firmware $18_A$ of FIG. 2 may be employed is shown in FIG. 3. FIG. 3 shows system 30 that includes multi-processor cells A-D, labeled $31_A$-$31_D$, respectively. Cell A $31_A$ is shown in more detail, and should be understood that cells B-D $31_B$-$31_D$ have substantially the same architecture as that of cell A $31_A$ in this example. The architecture of cell A $31_A$ described hereafter corresponds to that of Hewlett-Packard's Superdome™ systems. As shown, multi-processor cell A $31_A$ includes coherency controller 304 that is communicatively coupled to two buses, labeled 305 and 306, respectively. A plurality of processor modules are included within cell A $31_A$, shown as CPU 0, CPU 1, CPU 2 and CPU 3 (and labeled 300-303, respectively). More particularly, a plurality of processors modules are communicatively coupled to each of the buses 305 and 306. In this example, CPU 0 (300) and CPU 1 (301) are each communicatively coupled to the first bus 305, and CPU 2 (302) and CPU 3 (303) are each communicatively coupled to the second bus 306. It should be understood that each of CPU 0 (300), CPU 1 (301), CPU 2 (302), and CPU 3 (303) is in actuality a lockstep processor pair, such as the lockstep processor pair 12 of FIGS. 1-3. Thus, for instance, CPU 0 (300) includes both a master processor and a slave processor, as with processors 12A and 12B included in the lockstep processor pair 12 of FIGS. 1-2.

Coherency controller 304 decodes the address an interrupt is targeted towards and determines which bus (305 or 306) the interrupt packet should be delivered to. Each CPU on the destination bus sees the interrupt and compares the interrupt target address with its internal "LID" register to determine if it is the targeted CPU. If the match is correct, the CPU responds to the interrupt. If the match is not correct, the CPU ignores the interrupt packet.

As shown, the example firmware $18_A$ described above with FIGS. 1-2 may be employed to manage the recovery from detected LOLs for the processors of cells A-D ($31_A$-$31_D$). In this example architecture, when designating a spare for the boot processor, such spare is selected to be another processor communicatively coupled to the same bus as the boot processor. For instance, suppose that during the boot-up of system 30, CPU 2 (302) is designated as the boot processor. Accordingly, firmware $18^A$ will identify another processor that is communicatively coupled to bus 306 to designate as a spare for such boot processor, such as CPU 3 (303). During runtime if a LOL is detected for CPU 2 (302), then firmware $18_A$ may operate according to the process described above in FIG. 1 to switch the designation of boot processor to a designated spare, CPU 3 (303). In performing this switch the LID register of the CPU that lost lockstep is copied into the LID register of the spare CPU and the spare CPU pair will then assume the ID of the failed CPU and start responding to interrupts directed to that ID. The LID of the failed CPU is quickly re-written to a different value so that it will no longer respond to interrupts directed to that ID. CPU 2 (302) can then be reset to recover its lockstep, and such CPU 2 (302) may then be designated as a spare for the new boot processor CPU 3 (303).

It should be recognized that in the example system of FIG. 3, if a hot spare were used for recovering from LOL for all processors, rather than just for the boot processor, much of the potential processing resources would be required to be held in reserve as spare resources. For instance, a hot spare would be required on each of the buses of each cell. Because there are two processors coupled to each bus in this example (i.e., CPU 0 and CPU 1 coupled to bus 305, and CPU 2 and CPU 3 coupled to bus 306), reserving a hot spare processor for each bus would result in holding half of the total processing resources in reserve. This is an undesirably expensive and wasteful solution. Thus, according to the illustrated embodiment, a hot spare processor is reserved only for the boot processor. Thus, continuing with the above example in which CPU 2 is the boot processor and CPU 3 is held as a "hot" spare, both of CPU 0 and CPU 1 are active (i.e., neither are held in spare). Further, none of the processors of cells B-D need to be held in reserve as hot spares. In the event of a recoverable LOL occurring for any of non-boot processors of the cells, the lockstep recovery process of FIG. 1 (i.e., operational blocks 104-108) can be utilized without requiring a spare for lockstep recovery for those non-boot processors.

While in the above example embodiment, a hot spare CPU is maintained for recovery from LOL for the system's boot processor, in an alternative embodiment a hot spare need not be held as such, but rather a processor can be dynamically made a "spare" when needed for recovery from LOL encountered for the system boot processor. That is, assuming as in the above example of FIG. 3 that CPU 2 is the system's boot processor, CPU 3 does not have to be held in reserve (idled) as a hot spare for CPU 2, but instead CPU 3 can be active and dynamically idled and made a "spare" upon detection of LOL in CPU 2. Accordingly, CPU 3 may be designated as a spare for the boot processor, but such CPU 3 need not be held in reserve during normal system operation. Instead, the CPU 3 may be dynamically (during system run-time) transformed into a spare processor (e.g., by causing the OS to idle such processor) in the event that a LOL is detected for the boot processor.

Thus, the resource of this spare CPU need not be wasted during normal runtime, but can be dynamically turned into a spare processor that is available for recovering from LOL encountered on CPU 2 in the manner described above. As an example of this embodiment, the firmware may send an "eject request" on a healthy processor pair (e.g., CPU 3), and lie to the OS by indicating (e.g., in response to an ACPI _STA method for the healthy processor pair) that such processor pair is not functioning. This would cause the OS to eject that processor pair as though it had encountered a LOL. This processor would become the "hot spare" and be used to replace the boot processor. The system boot processor role would be assumed by the idled healthy processor pair, just as described above in the example in which the healthy CPU 3 is held idle for the system boot processor, CPU 2. The only difference being that now the firmware had to take some initial action to turn the healthy processor pair into a "hot spare" by idling it and making it appear to the OS as though it was not functioning. Thus, the LIDs would be swapped. That is, the LID register of the boot processor that lost lockstep is copied into the LID register of the now spare processor pair (CPU 3 in this example), and the LID register of this spare processor pair would be copied into the LID register of the original boot processor. Lockstep is then reestablished on the original boot processor, and it can be reintroduced to the OS with the ID of the original non-boot processor that replaced it as the system boot processor. The processor that was formerly the boot processor may be designated, in device tree 203, as the spare for the now boot processor.

Figure 4:
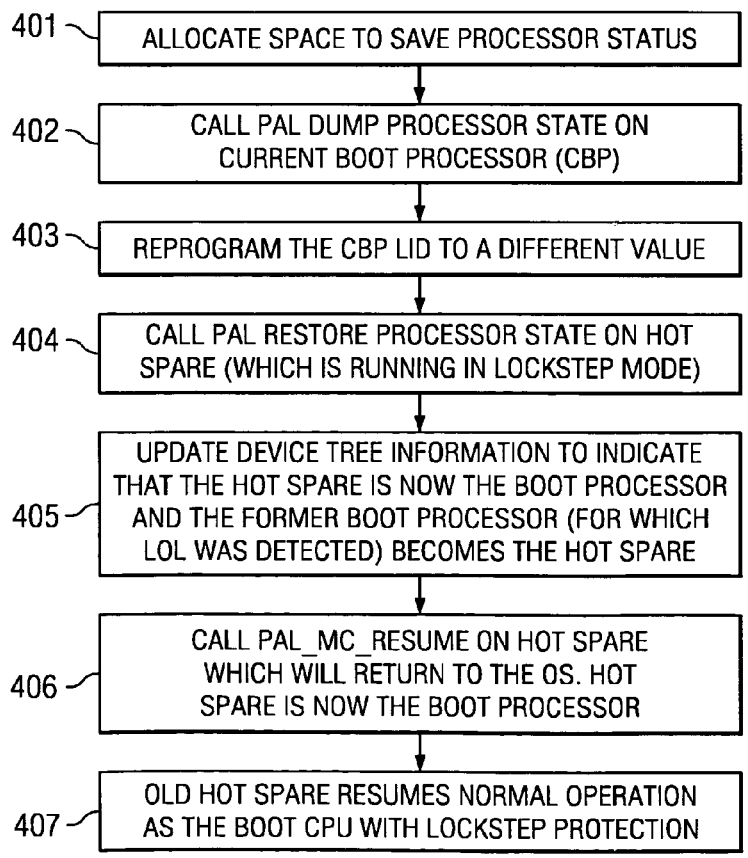
FIG. 4 shows an exemplary operational flow diagram for switching the role of boot processor to a hot spare processor according to one embodiment.

Turning to FIG. 4, an exemplary operational flow diagram for switching the role of boot processor to a hot spare processor according to one embodiment is shown. In this case, an LOL has been detected for the boot processor. In operational block 401, the system firmware allocates space to save the status of the good processor of the lockstep pair of processors for which LOL was detected. Exemplary techniques for determining which of the lockstep pair of processors had the error are disclosed in concurrently filed and commonly assigned U.S. patent application Ser. No. 10/972,835 (U.S. Published Patent Application 20060107114) titled "SYSTEM AND METHOD FOR USING INFORMATION RELATING TO A DETECTED LOSS OF LOCKSTEP FOR DETERMINING A RESPONSIVE ACTION," the disclosure of which is hereby incorporated herein by reference. Accordingly, an appropriate amount of data storage space for storing the cache of the "good" processor in the lockstep pair of processors is allocated in block 401. For instance, an amount of SRAM may be allocated for storing the registers from the good processor.

In operational block 402, the state of the good processor is stored to the allocated storage space. For instance, in this illustrative example, PAL is called to dump the processor state of the good processor of the current boot processor (CBP) module (for which LOL was detected) to the allocated storage space.

In operational block 403, the LID of the current boot processor (for which LOL was detected) is reprogrammed to a different value. For instance, the current boot processor may be assigned a LID that is reserved just for this situation (i.e., for switching the role of boot processor). Accordingly, the boot processor for which LOL was detected will not respond to the interrupts addressed for its original LID because the boot processor's LID value is reprogrammed to a different value.

In operational block 404, the state of the good processor that was stored in block 402 to the allocated storage space is stored to the hot spare processor. In this example, the PAL is called to "Restore Processor State" on the hot spare processor, wherein the PAL is provided a pointer to the address to which the good processor's state was stored in block 402. Accordingly, all the values from that storage space will be read into the registers of the spare processor. As a result, the LID value of the spare processor is programmed with the value of the boot processor that was saved to the allocated storage space. Accordingly, the spare processor automatically, as a result of receiving this stored state, receives the Local ID corresponding to the boot processor for interrupt handling.

In operational block 405, the system firmware updates its device tree information to reflect that the hot spare is assuming the role of boot processor. The system firmware further updates its device tree, in this example, to indicate that the former boot processor (for which LOL was detected) is assuming the role of hot spare for the new boot processor.

In operational block 406, PAL_MC_RESUME (which is a standard PAL call for resuming normal execution after a machine check (MC)) is called for the hot spare (which is assuming the role of boot processor) to cause the OS to recognize the hot spare processor as available for processing instructions, wherein the OS recognizes the hot spare as the boot processor. Thus, the hot spare has now assumed the role of the boot processor, taking the place of the former boot processor for which LOL was detected. Accordingly, in operational block 407 the former hot spare (which has assumed the role of boot processor) resumes normal operation as the system's boot processor with its lockstep protection enabled. Thus, in this exemplary embodiment, upon detection of LOL for a boot processor, the role of boot processor is switched to a hot spare that has lockstep protection, wherein the system effectively recovers lockstep for its boot processor without requiring a system shut down (i.e., without shutting down the OS). In certain implementations, the firmware may go on to take action to attempt to reestablish lockstep for the former boot processor (e.g., by resetting the former boot processor), and if successful in reestablishing its lockstep, such former boot processor may be held in reserve as a hot spare processor for the new boot processor in the event that LOL is detected for this new boot processor.

Turning to FIG. 5, an exemplary operational flow diagram for switching the role of boot processor to an active spare processor according to one embodiment is shown. Again, an LOL has been detected for the boot processor. In operational block 501, the system firmware, responsive to such detection of LOL for the boot processor, examines the device tree to determine which processor module is assigned the role of active spare. In operational block 502 the system firmware (e.g., SAL) asserts a General Purpose Event Interrupt (GPE) by writing to the appropriate GPE register in the ACPI register space. This causes the OS to execute its interrupt handler, which will run. an AML Method associated with this particular interrupt. In this example, this AML method that is executed responsive to the interrupt generated by the GPE includes an AML instruction called "Notify". This "Notify" operation indicates the determined active spare processor object and that an Eject is being requested as arguments. Accordingly, an AML method is used to request the OS to eject the active spare that was determined in block 501. In response, the OS idles the active spare processor and returns control over the active spare processor to the system firmware, in block 503.

In operational block 504, the system firmware allocates space to save the status of the good processor of the lockstep pair of processors for which LOL was detected (i.e., the lockstep pair of processors of the CBP). Exemplary techniques for determining which of the lockstep pair of processors had the error are disclosed in concurrently filed and commonly assigned U.S. patent application Ser. No. 10/972, 835 (U.S. Published Patent Application No. 20060107114) titled "SYSTEM AND METHOD FOR USING INFORMATION RELATING TO A DETECTED LOSS OF LOCKSTEP FOR DETERMINING A RESPONSIVE ACTION," the disclosure of which is hereby incorporated herein by reference. Accordingly, an appropriate amount of data storage space for storing the cache of the "good" processor in the lockstep pair of processors is allocated in block 504. For instance, an amount of SRAM may be allocated for storing the registers from the good processor.

In operational block 505, the state of the good processor is stored to the allocated storage space. For instance, in this illustrative example, PAL is called to dump the processor state of the good processor of the current boot processor (CBP) module (for which LOL was detected) to the allocated storage space.

In operational block 506, the LID of the current boot processor (for which LOL was detected) is reprogrammed to a different value. For instance, the current boot processor may be assigned a LID that is reserved just for this situation (i.e., for switching the role of boot processor). Accordingly, the boot processor for which LOL was detected will not respond to the interrupts addressed for its original LID because the boot processor's LID value is reprogrammed to a different value.

In operational block 507, the state of the good processor that was stored in block 505 to the allocated storage space is stored to the idled spare processor. In this example, the PAL is called to "Restore Processor State" on the active spare processor, wherein the PAL is provided a pointer to the address to which the good processor's state was stored in block 505. Accordingly, all the values from that storage space will be read into the registers of the spare processor. As a result, the LID value of the spare processor is programmed with the value of the boot processor that was saved to the allocated storage space. Accordingly, the spare processor automatically, as a result of receiving this stored state, receives the Local ID (LID) corresponding to the boot processor for interrupt handling.

In operational block 508, the system firmware updates its device tree information to reflect that the active spare is assuming the role of boot processor. The system firmware further updates its device tree, in this example, to indicate that the former boot processor (for which LOL was detected) is assuming the role of active spare for the new boot processor.

In operational block 509, PAL_MC_RESUME (which is a standard PAL call for resuming normal execution after a machine check (MC)) is called for the active spare (which is assuming the role of boot processor) to cause the OS to recognize the active spare processor as available for processing instructions, wherein the OS recognizes the active spare as the boot processor. Thus, the active spare has now assumed the role of the boot processor, taking the place of the former boot processor for which LOL was detected. Accordingly, in operational block 510 the former active spare (which has assumed the role of boot processor) resumes normal operation as the system's boot processor with its lockstep protection enabled. Thus, in this exemplary embodiment, upon detection of LOL for a boot processor, an active spare processor is idled, and the role of boot processor is switched to such idled spare that has lockstep protection, wherein the system effectively recovers lockstep for its boot processor without requiring a system shut down (i.e., without shutting down the OS). In certain implementations, the firmware may go on to take action to attempt to reestablish lockstep for the former boot processor (e.g., by resetting the former boot processor), and if successful in reestablishing its lockstep, such former boot processor may be reintroduced to the OS as an active spare processor for the new boot processor in the event that LOL is detected for this new boot processor.

The exemplary procedures of FIGS. 4 and 5 switch the role of boot processor to a spare processor in accordance with certain embodiments. While exemplary operational flows are provided in FIGS. 4 and 5, embodiments hereof are not limited to those illustrative examples. For instance, FIG. 6 shows a more general operational flow diagram for certain embodiments. In operational block 601, LOL is detected for a processor in a multi-processor system. In operational block 602, the system (e.g., system firmware) determines whether the processor for which LOL is detected is the system's boot processor. As described above, this is determined in certain embodiments by accessing the node of the device tree corresponding to the processor for which LOL is detected and determining if the information in that node of the device tree indicates that the processor is the system's boot processor.

In operational block 603, responsive to determining that the processor for which LOL is detected is the system's boot processor, the system's firmware switches the role of boot processor to a spare processor, which may be either a hot spare or an active spare, as described above. Accordingly, the system's OS recognizes the spare processor as the system boot processor. In view of the above, embodiments hereof enable the role of boot processor to be dynamically switched, during system runtime, to a spare processor responsive to a detected LOL for the boot processor, thus enabling recovery from the LOL without requiring that the system be crashed or re-booted.

What is claimed is:

1. A method comprising:
   detecting loss of lockstep (LOL) for a processor in a multi-processor system;
   determining that the processor for which said LOL is detected is assigned a role of boot processor;
   changing a system identifier, used by the system's operating system to recognize the boot processor, of said boot processor for which said LOL is detected, to a different value, which causes the system's operating system to not recognize the processor for which said LOL is detected as the boot processor; and
   changing a system identifier of the spare processor to that of the boot processor, thereby switching the role of boot processor to a spare processor without shutting down the system's operating system.

2. The method of claim 1 wherein the spare processor is a hot spare that is held in idle until switched the role of boot processor.

3. The method of claim 1 wherein the spare processor is an active spare.

4. The method of claim 3 wherein said switching further comprises:
   causing the system's operating system to idle the active spare.

5. The method of claim 1 wherein the spare processor is a processor module that includes a master and slave processors that operate in lockstep.

6. The method of claim 1 wherein said determining that the processor for which said LOL is detected is assigned the role of boot processor comprises:
   accessing information stored to non-volatile data storage that identifies one of the processors in said multi-processor system that is assigned the role of boot processor.

7. The method of claim 1 further comprising:
   determining the processor that is assigned the role of spare processor.

8. The method of claim 7 wherein said determining the processor that is assigned the role of spare processor comprises:
   accessing information stored to non-volatile data storage that identifies one of the processors in said multi-processor system that is assigned the role of spare processor.

9. The method of claim 1 wherein said determining step is performed by system firmware.

10. The method of claim 1 wherein said switching step is performed by system firmware.

11. The method of claim 1 wherein the processor for which said LOL is detected includes a lockstep pair of processors, and wherein said switching comprises:
    determining one of the lockstep pair of processors that is not the cause of said LOL; and
    copying the state of the determined one of said lockstep pair of processors that is not the cause of said LOL to said spare processor.

12. The method of claim 11 wherein said spare processor includes a lockstep pair of processors, and wherein said copying comprises:
    copying the state of the determined one of said lockstep pair of processors that is not the cause of said LOL to each of said lockstep pair of processors of said spare processor.

13. A method comprising:
    system firmware determining that loss of lockstep (LOL) is detected for a lockstep pair of processors that are assigned the role of boot processor in a system;
    determining one of said lockstep pair of processors that is not the cause of said LOL;
    copying the state of the determined one of said lockstep pair of processors that is not the cause of said LOL to a spare processor;
    changing a system identifier, used by the system's operating system to recognize the boot processor, of said lockstep pair of processors that are assigned the role of boot processor, to a different value, which causes the s system's operating system to not recognize the lock step pair of processors for which said LOL is detected as the processor; and
    changing a system identifier of the spare processor to that of the boot processor, thereby switching the role of boot processor to said spare processor.

14. The method of claim 13 wherein the spare processor is a hot spare that is held in idle until switched the role of boot processor.

15. The method of claim 13 wherein the spare processor is an active spare.

16. The method of claim 15 further comprising:
    causing the system's operating system to idle the active spare.

17. The method of claim 13 wherein said switching causes the system's operating system to recognize said spare processor as said boot processor without shutting down said operating system.

18. The method of claim 13 wherein said determining step is performed by system firmware.

19. The method of claim 13 wherein said copying step is performed by system firmware.

20. The method of claim 13 wherein said switching step is performed by system firmware.

21. A system comprising:
    a plurality of processor modules that each include a master processor and a slave processor that operate in lockstep;
    an operating system;
    error detection logic operable to detect loss of lockstep (LOL) for at least one of said processor modules; and
    system firmware operable, responsive to the detection of LOL for a first of said processor modules, to determine whether said first processor module is assigned a role of system boot processor;
    wherein if determined that said first processor module is assigned the role of system boot processor, said system firmware is further operable to cause said operating system to recognize another processor module as system boot processor without shutting down said operating system.

22. The system of claim 21 wherein the another processor module is a processor module assigned a role of spare processor.

23. The system of claim 21 wherein the another processor module is held in idle until said system firmware causes said operating system to recognize said another processor module as said system boot processor.

24. The system of claim 21 wherein the system firmware causes the operating system to idle the another processor module before causing said operating system to recognize said another processor module as said system boot processor.

25. The system of claim 21 further comprising:
non-volatile data storage storing information that assigns the role of system boot processor to one of said plurality of processor modules.

26. A system comprising:
system firmware means for detecting loss of lockstep (LOL) for a processor in a multi-processor system;
means for determining whether the processor for which said LOL is detected is assigned the role of boot processor; and
system firmware means for switching the role of boot processor to a spare processor without shutting down the system's operating system if determined that the processor for which said LOL is detected is assigned the role of boot processor.

27. The system of claim 26 wherein said processor in said multi-processor system is an Itanium Processor Family (IPF) processor.

* * * * *

UNITED STATES PATENT AND TRADEMARK OFFICE
CERTIFICATE OF CORRECTION

PATENT NO. : 7,624,302 B2 Page 1 of 1
APPLICATION NO. : 10/972588
DATED : November 24, 2009
INVENTOR(S) : Scott L. Michaelis et al.

It is certified that error appears in the above-identified patent and that said Letters Patent is hereby corrected as shown below:

In column 20, line 13, in Claim 13, after "the" delete "s".

In column 20, line 16, in Claim 13, before "processor;" insert -- boot --.

In column 21, line 8, in Claim 26, before "means" insert -- system firmware --.

Signed and Sealed this

Sixteenth Day of February, 2010

David J. Kappos
*Director of the United States Patent and Trademark Office*